United States Patent
Baird et al.

(10) Patent No.: US 11,124,293 B2
(45) Date of Patent: Sep. 21, 2021

(54) INTEGRAL BRACKET MANIFOLD FOR LANDING GEAR ASSEMBLIES

(71) Applicant: GOODRICH CORPORATION, Charlotte, NC (US)

(72) Inventors: Bradley William Baird, Grimsby (CA); Hiran S. Mistry, Caledon (CA)

(73) Assignee: Goodrich Corporation, Charlotte, NC (US)

( * ) Notice: Subject to any disclaimer, the term of this patent is extended or adjusted under 35 U.S.C. 154(b) by 337 days.

(21) Appl. No.: 16/392,136

(22) Filed: Apr. 23, 2019

(65) Prior Publication Data
US 2020/0339250 A1    Oct. 29, 2020

(51) Int. Cl.
*B64C 25/10* (2006.01)
*B64F 5/10* (2017.01)
*B64C 25/60* (2006.01)

(52) U.S. Cl.
CPC .............. *B64C 25/10* (2013.01); *B64C 25/60* (2013.01); *B64F 5/10* (2017.01)

(58) Field of Classification Search
CPC ......... B64C 25/10; B64C 25/22; B64C 25/60; B64F 5/10; B60K 17/28; B63H 20/02
See application file for complete search history.

(56) References Cited

U.S. PATENT DOCUMENTS

| | | | | |
|---|---|---|---|---|
| 6,409,121 | B1 * | 6/2002 | Lindahl | B64C 25/02 244/100 R |
| 7,810,755 | B2 * | 10/2010 | Reynes | F15B 13/0842 244/104 FP |
| 2001/0032747 | A1 | 10/2001 | Depoy et al. | |
| 2010/0257946 | A1 | 10/2010 | Inns et al. | |
| 2017/0022614 | A1 | 1/2017 | Herrmann | |
| 2017/0369157 | A1 | 12/2017 | Gurvich et al. | |
| 2018/0058610 | A1 | 3/2018 | Williams | |

FOREIGN PATENT DOCUMENTS

| | | |
|---|---|---|
| EP | 3239045 | 11/2017 |
| EP | 3269524 | 1/2018 |

OTHER PUBLICATIONS

European Patent Office, European Search Report dated Jul. 16, 2020 in Application No. 19215695.8.

* cited by examiner

*Primary Examiner* — Richard R. Green
*Assistant Examiner* — Ashesh Dangol
(74) *Attorney, Agent, or Firm* — Snell & Wilmer L.L.P.

(57) ABSTRACT

A bracket manifold for a landing gear assembly is disclosed. In various embodiments, the bracket manifold includes a mounting plate having a central portion and a first wing portion extending from the central portion; and a first manifold section integrated monolithically into at least one of the central portion and the first wing portion of the mounting plate.

16 Claims, 6 Drawing Sheets

INTEGRAL BRACKET MANIFOLD FOR LANDING GEAR ASSEMBLIES

FIELD

The present disclosure relates generally to landing gear assemblies and, more particularly, to integral bracket and manifold components used to secure and route hydraulic fluid and electrical conduits within landing gear assemblies.

BACKGROUND

A landing gear assembly typically comprises a shock strut assembly coupled to a wheel assembly, which may include a wheel truck or bogie beam having one or more wheels or brake stacks mounted thereon. Other components of the landing gear assembly, including, for example, a pintle frame, one or more torque links, or one or more drag braces may be secured to the shock strut assembly. Operation of the landing gear assembly typically requires the provision of hydraulic fluids via hydraulic fluid conduits and electrical signals via electrical cables to various of the components, such as, for example, the brake stacks. In order to adequately secure such conduits and cables, brackets may be attached to various components of the landing gear assembly and used to mount or otherwise secure and route the conduits and cables.

SUMMARY

A bracket manifold for a landing gear assembly is disclosed. In various embodiments, the bracket manifold includes a mounting plate having a central portion and a first wing portion extending from the central portion; and a first manifold section integrated monolithically into at least one of the central portion and the first wing portion of the mounting plate.

In various embodiments, a first upstream connector is integrated monolithically into the mounting plate and disposed in fluid connection with the first manifold section. In various embodiments, a first downstream connector is integrated monolithically into the mounting plate and disposed in fluid connection with the first manifold section. In various embodiments, a first base portion is configured to provide an integral and monolithic transition between the first manifold section and the mounting plate.

In various embodiments, an attachment plate is disposed proximate the central portion and configured to attach the bracket manifold to a component of the landing gear assembly. In various embodiments, the attachment plate includes an attachment plate aperture configured to receive an attachment bolt. In various embodiments, a first side wall and a second side wall are integrated monolithically into the attachment plate and into the mounting plate and configured to space the attachment plate from the mounting plate.

In various embodiments, a second manifold section is integrated monolithically into the mounting plate. In various embodiments, a second upstream connector is integrated monolithically into the mounting plate and disposed in fluid connection with the second manifold section and a second downstream connector is integrated monolithically into the mounting plate and disposed in fluid connection with the second manifold section.

In various embodiments, the mounting plate includes a second wing portion extending from the central portion. In various embodiments, a mounting shelf is integrated monolithically into at least one of the central portion and the second wing portion. In various embodiments, the mounting shelf is configured to receive an electrical conduit. In various embodiments, a shield is integrated monolithically into at least one of the first wing portion and the second wing portion. In various embodiments, an attachment plate is configured to attach the bracket manifold to a component of the landing gear assembly and a first side wall and a second side wall are integrated monolithically into the attachment plate and into the mounting plate and configured to space the attachment plate from the mounting plate.

A landing gear assembly is disclosed. In various embodiments, the landing gear includes a shock strut assembly having a piston slidably disposed within an outer cylinder; a torque link assembly having a torque link coupled to the shock strut assembly; and a bracket manifold attached to the torque link assembly, the bracket manifold comprising a mounting plate having a central portion and a first wing portion extending from the central portion, and a first manifold section integrated monolithically into at least one of the central portion and the first wing portion of the mounting plate.

In various embodiments, a first upstream connector is integrated monolithically into the mounting plate and disposed in fluid connection with the first manifold section and a first downstream connector is integrated monolithically into the mounting plate and disposed in fluid connection with the first manifold section. In various embodiments, the bracket manifold further includes a second manifold section integrated monolithically into the mounting plate, a second upstream connector integrated monolithically into the mounting plate and disposed in fluid connection with the second manifold section and a second downstream connector integrated monolithically into the mounting plate and disposed in fluid connection with the second manifold section. In various embodiments, the mounting plate includes a second wing portion extending from the central portion and a mounting shelf integrated monolithically into at least one of the central portion and the second wing portion, the mounting shelf configured to receive an electrical conduit.

A method of securing components of a hydraulic system and an electrical system to a landing gear assembly is disclosed. In various embodiments, the method includes the steps of attaching a bracket manifold to the landing gear assembly, the bracket manifold including a mounting plate, a first manifold section integrated monolithically into the mounting plate and a mounting shelf integrated monolithically into the mounting plate; securing a first upstream hydraulic hose to the first manifold section and a first downstream hydraulic hose to the first manifold section; and securing an electrical conduit to the mounting shelf. In various embodiments, a second upstream hydraulic hose and a second downstream hydraulic hose are secured to a second manifold section integrated monolithically into the mounting plate.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Figure 1:
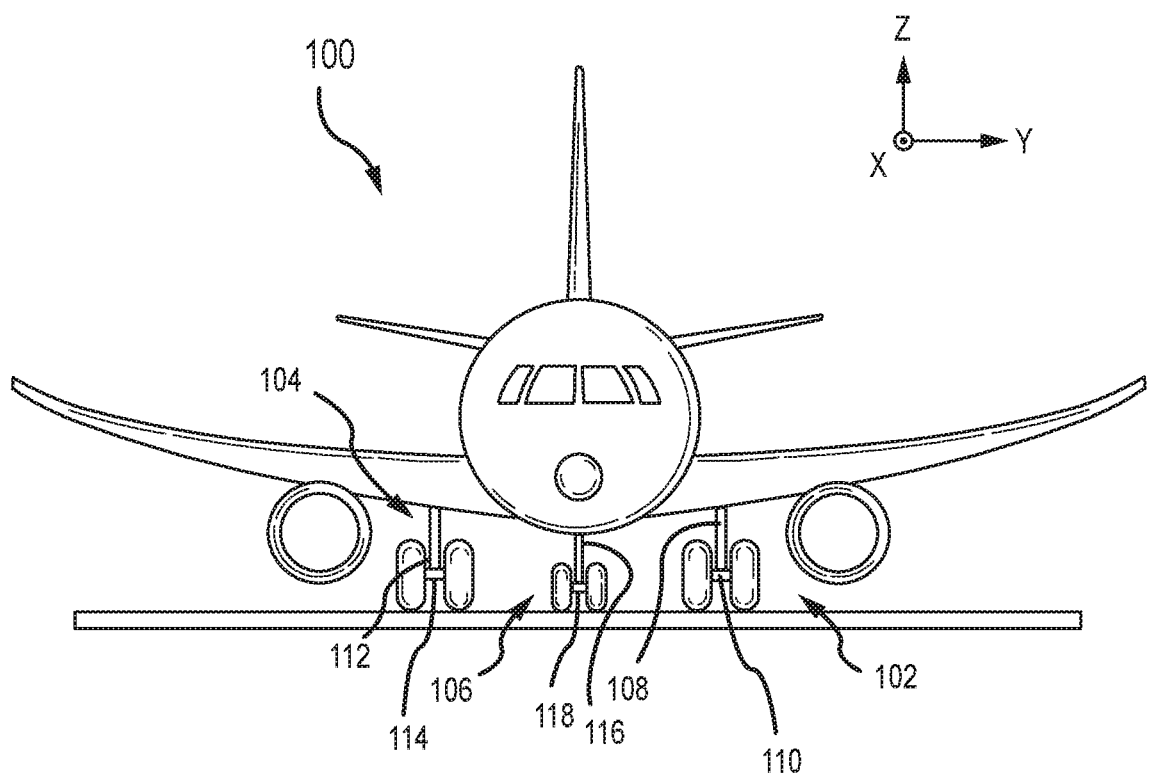
FIG. 1 illustrates an aircraft having a landing gear assembly and wheels mounted thereon, in accordance with various embodiments.

With reference to FIG. 1, an aircraft 100 is illustrated. In accordance with various embodiments, the aircraft 100 may include one or more landing gear assemblies, such as, for example, a left landing gear assembly 102 (or port-side landing gear assembly), a right landing gear assembly 104 (or starboard-side landing gear assembly) and a nose landing gear assembly 106. Each of the left landing gear assembly 102, the right landing gear assembly 104 and the nose landing gear assembly 106 may support the aircraft 100 when not flying, allowing the aircraft 100 to taxi, take off and land, safely and without damage to the aircraft. In various embodiments, the left landing gear assembly 102 may include a left shock strut assembly 108 and a left wheel assembly 110, the right landing gear assembly 104 may include a right shock strut assembly 112 and a right wheel assembly 114 and the nose landing gear assembly 106 may include a nose shock strut assembly 116 and a nose wheel assembly 118.

Figure 2A:
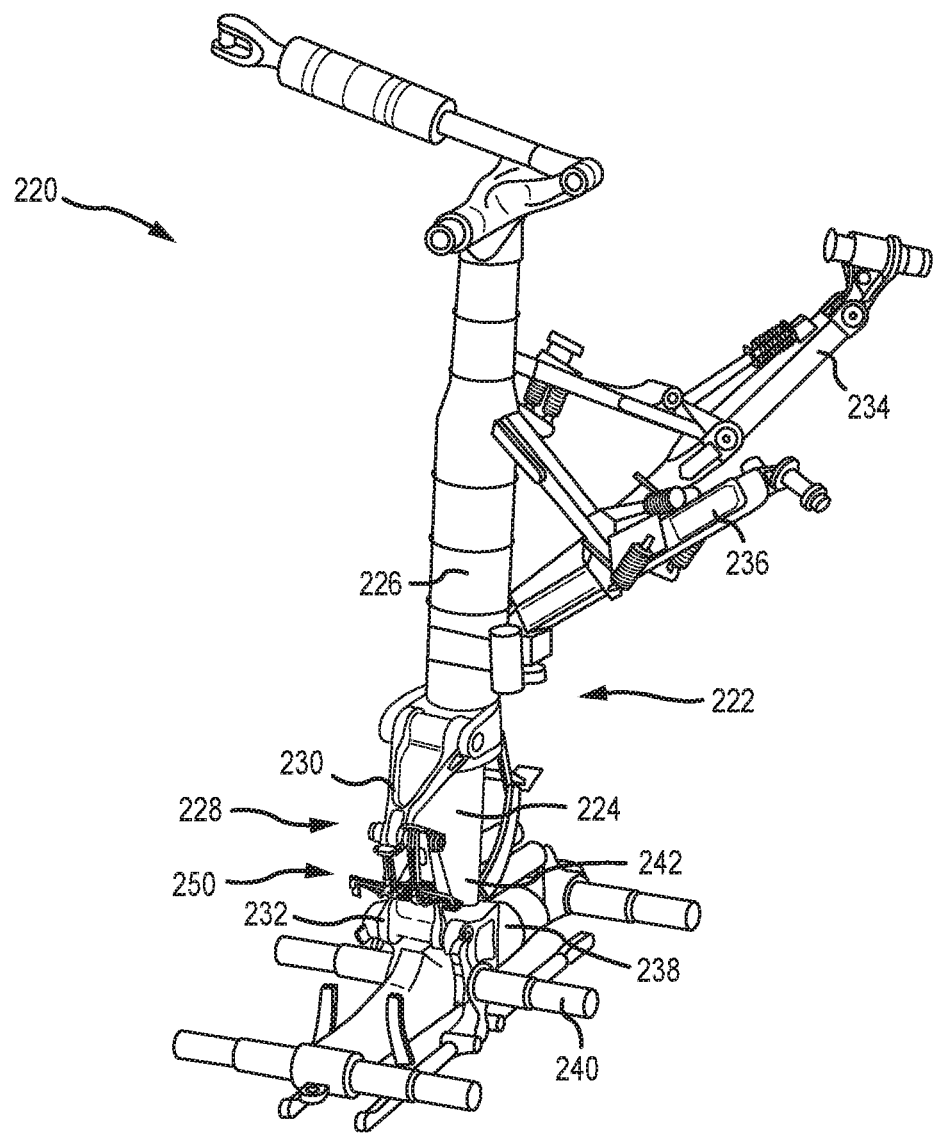
FIG. 2A illustrates a landing gear assembly, in accordance with various embodiments.
Figure 2B:
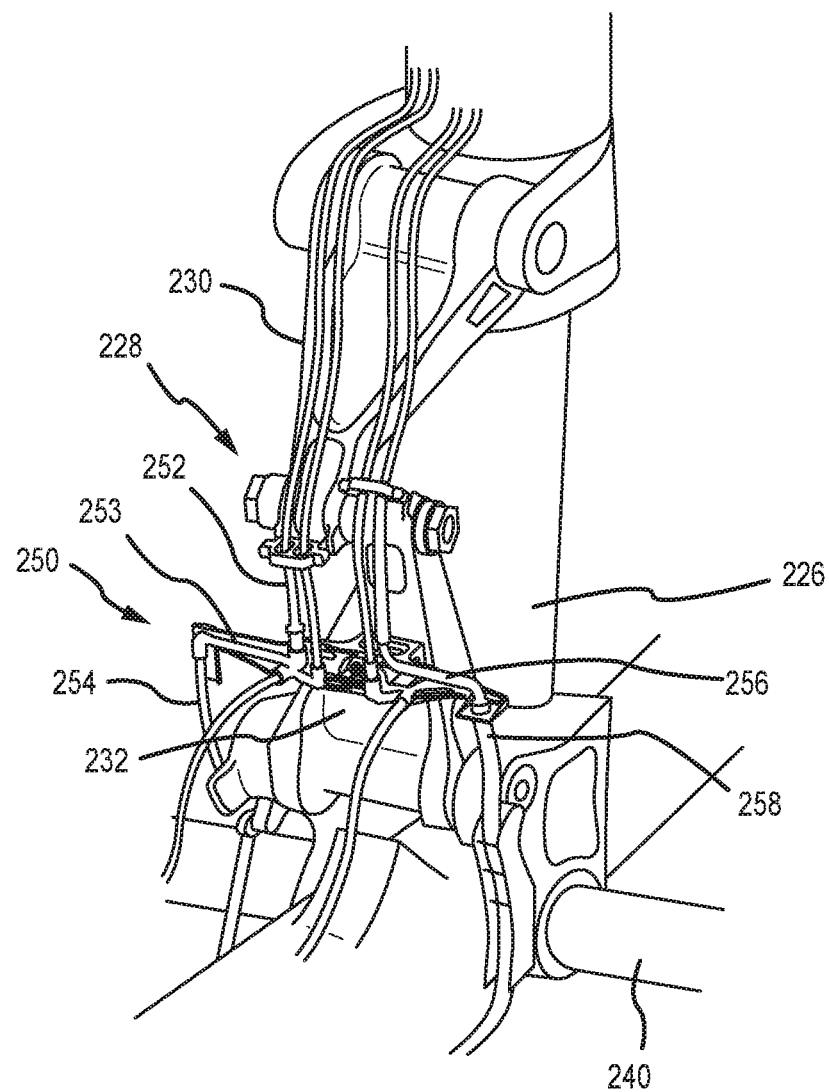
FIG. 2B illustrates a bracket manifold attached to a torque link of a landing gear assembly, in accordance with various embodiment.

Referring now to FIGS. 2A and 2B, a landing gear assembly 220, similar to one of the left landing gear assembly 102 and the right landing gear assembly 104 described above with reference to FIG. 1, is illustrated. In various embodiments, the landing gear assembly 220 includes a shock strut assembly 222, which may include a piston 224 slidably disposed within an outer cylinder 226. A torque link assembly 228, comprising an upper torque link 230 and a lower torque link 232, either of which may be referred to as a first torque link, a second torque link or a torque link, couple the piston 224 to the outer cylinder 226. In various embodiments, one or more braces, such as, for example, a first brace 234 and a second brace 236 couple the outer cylinder 226 to a mounting structure of an aircraft fuselage. A bogie beam 238, from which an axle 240 (or a plurality of axles) extend, may be coupled to a distal end 242 of the piston 224. The axle 240 is configured to carry one or more wheels, such as, for example, one of the wheels of the left wheel assembly 110 or one of the wheels of the right wheel assembly 114 described above with reference to FIG. 1.

Referring more specifically to FIG. 2B, a bracket manifold 250 may be attached to a component of the torque link assembly 228, such as, for example, the lower torque link 232. In various embodiments, and as described further below, the bracket manifold 250 may be configured to secure one or more hydraulic hoses, such as, for example, a first upstream hydraulic hose 252 and a first downstream hydraulic hose 254, to the torque link assembly 228 or to some other component of the landing gear assembly 220; the reference to upstream and downstream distinguishing, respectively, the section of hydraulic hose on the fuselage side of the bracket manifold 250 from the section of hydraulic hose on the wheel side of the bracket manifold 250. The bracket manifold 250 includes one or more manifold sections, such as, for example, a first manifold section 253 configured to fluidly couple the first upstream hydraulic hose 252 to the first downstream hydraulic hose 254. In various embodiments, the bracket manifold 250 may also be configured to secure one or more electrical cables via one or more electrical conduits, such as, for example, a first upstream electrical conduit 256 to a first downstream electrical conduit 258. In various embodiments, the bracket manifold 250 comprises an integral or a monolithic component, constructed, for example, using an additive manufacturing process.

Figure 3A:
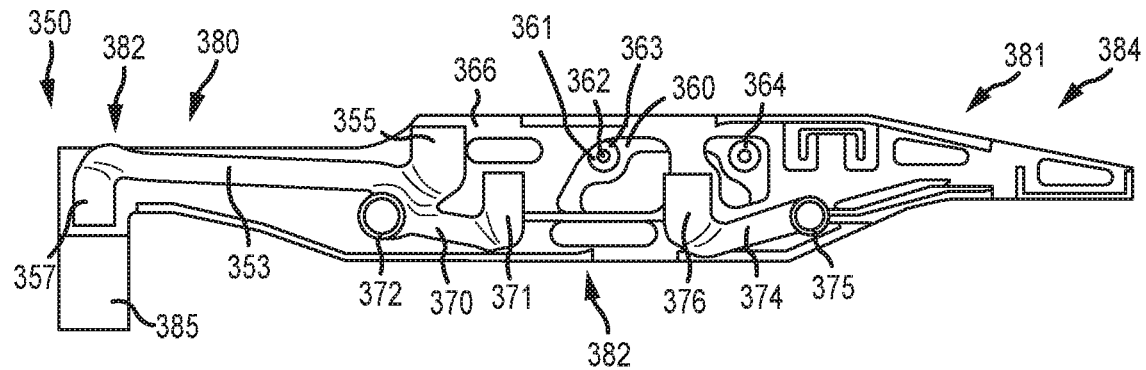
FIGS. 3A and 3B illustrate views of a bracket manifold, in accordance with various embodiments.
Figure 3B:
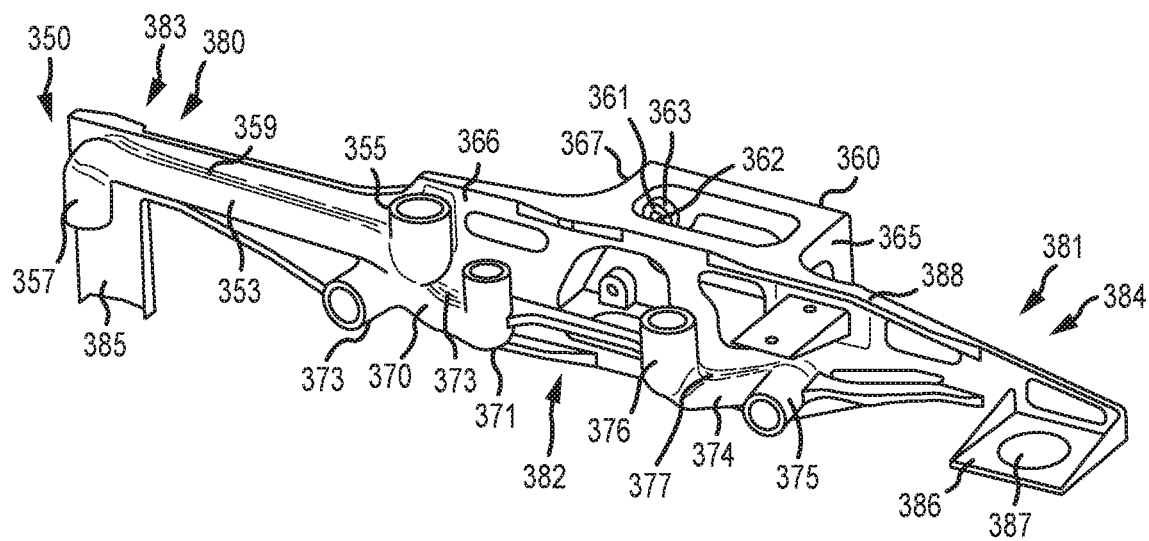

Referring now to FIGS. 3A and 3B, an overhead view and a perspective view of a bracket manifold 350, respectively, are illustrated. In various embodiments, the bracket manifold 350 includes an attachment plate 360 configured for attachment to a receiving component, such as, for example, the lower torque link 232 described above with respect to FIG. 2B. The attachment plate 360 may comprise an attachment plate aperture extending therethrough (or a plurality of attachment plate apertures), such as, for example, a first attachment plate aperture 362 or a second attachment plate aperture 364, each of which is configured to receive an attachment bolt (e.g., the first attachment bolt 490 illustrated in FIG. 4) for threading into a threaded receiving component and attaching the bracket manifold 350 thereto. In various embodiments, for example, each attachment plate aperture may include a threaded boss structure 363 configured to receive the attachment bolt. In various embodiments, the threaded boss structure 363 may be complimented with or replaced by a threaded insert (e.g., a first threaded insert 361), such as, for example, a Heli-Coil®, available from STANLEY Engineered Fastening, Towson, Md. The bracket manifold 350 may also include a mounting plate 366 connected to the attachment plate 360 by one or more side walls, such as, for example, a first side wall 365 and a second side wall 367. In various embodiments, the attachment plate 360, the mounting plate 366 and the first side wall 365 and the second side wall 367 are integrated monolithically into a single component.

Still referring to FIGS. 3A and 3B, the mounting plate 366 is configured to provide a stable platform for integrating one or more manifold sections or other mounting platforms or shelves into the bracket manifold 350. In various embodiments, for example, a first manifold section 353, similar to the first manifold section 253 described above with reference to FIG. 2B, is integrated into the mounting plate 366. A first upstream connector 355 and a first downstream connector 357 are also integrated into the mounting plate 366 and configured to receive and fluidly couple, respectively, a first upstream hydraulic hose and a first downstream hydraulic hose. The first upstream hydraulic hose and the first downstream hydraulic hose are similar to the first upstream hydraulic hose 252 and the first downstream hydraulic hose 254 described above with reference to FIG. 2B. As illustrated in FIG. 3B, one or more of the first manifold section 353, the first upstream connector 355 and the first downstream connector 357 may be connected to the mounting plate 366 via a first base portion 359 that extends and provides an integral and monolithic transition between the recited components (i.e., the one or more of the manifold section and the upstream and downstream connectors) and the mounting plate 366.

In various embodiments, the bracket manifold 350 further includes a second manifold section 370, a second upstream connector 371 and a second downstream connector 372, one or more of which is integrated monolithically into the mounting plate 366 via a second base portion 373 and configured to receive and fluidly couple, respectively, a second upstream hydraulic hose and a second downstream hydraulic hose. Similarly, in various embodiments, the bracket manifold 350 further includes a third manifold section 374, a third upstream connector 375 and a third downstream connector 376, one or more of which is integrated monolithically into the mounting plate 366 via a third base portion 377 and configured to receive and fluidly couple, respectively, a third upstream hydraulic hose and a third downstream hydraulic hose.

Still referring to FIGS. 3A and 3B, in various embodiments, the bracket manifold 350 or, more particularly, the mounting plate 366, includes a first wing portion 380 and a second wing portion 381 that extend, respectively, from a central portion 382 toward a first distal end 383 and a second distal end 384 of the bracket manifold 350. In various embodiments, the first wing portion 380 includes a shield 385 that is integrated monolithically into the mounting plate 366 and configured to protect either or both of the first downstream connector 357 and at least a portion of the first downstream hydraulic hose extending from the first downstream connector 357 from debris, such as rocks, birds or ice. While the shield 385 is illustrated as protecting the either or both of the first downstream connector 357 and at least a portion of the first downstream hydraulic hose extending from the first downstream connector 357, similar shields may be integrated monolithically into the bracket manifold 350 to protect other components secured thereto. In various embodiments, the second wing portion 381 may include a mounting shelf that is integrated monolithically into the mounting plate 366 and configured to secure an electrical conduit or other component of a landing gear assembly. For example, in various embodiments, a first mounting shelf 386 may include a central opening 387 through which an electrical cable may extend via an electrical conduit. The electrical conduit may comprise a first upstream electrical conduit and a first downstream electrical conduit, such as, for example, the first upstream electrical conduit 256 and the first downstream electrical conduit 258 described above with reference to FIG. 2B. In various embodiments, a second mounting shelf 388 may be integrated monolithically into one of the second wing portion 381 or proximate the central portion 382 and configured to provide a platform to secure a cable or other component of a landing gear assembly.

Figure 4:
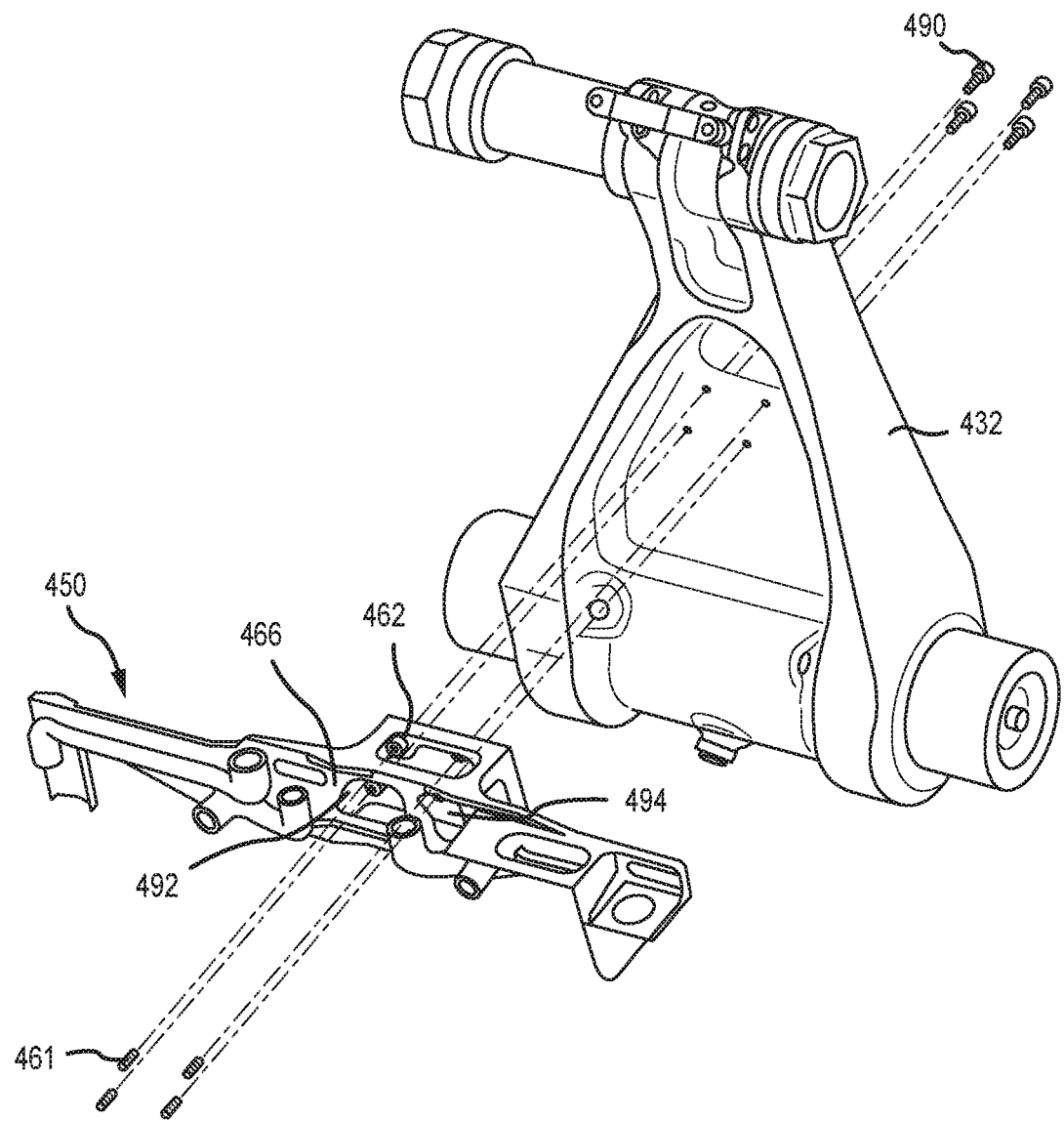
FIG. 4 illustrates an exploded view of a bracket manifold being mounted to a lower torque link, in accordance with various embodiments.

Referring now to FIG. 4, an exploded view of a bracket manifold 450 being mounted to a lower torque link 432 is illustrated. The bracket manifold 450 and the lower torque link 432 are similar to the bracket manifold 350 described above with reference to FIGS. 3A and 3B and the lower torque link 232 described above with reference to FIGS. 2A and 2B. In various embodiments, an attachment bolt (or a plurality of attachment bolts), such as, for example, a first attachment bolt 490, may be used to secure the bracket manifold 450 to the lower torque link 432 by inserting the first attachment bolt 490 through the lower torque link 432 and into a first attachment plate aperture 462 (similar to the first attachment plate aperture 362 described above with reference to FIGS. 3A and 3B). In various embodiments, an opening (or a plurality of openings), such as, for example, a first opening 492 or a second opening 494 may extend through a mounting plate 466 (e.g., the mounting plate 366 described above with reference to FIGS. 3A and 3B) of the bracket manifold 450. For example, the first opening 492 provides access to the first attachment plate aperture 462 and facilitates installation of a first threaded insert 461, such as, for example, the first threaded insert 361 described above with reference to FIGS. 3A and 3B, configured to receive the first attachment bolt 490.

Figure 5:
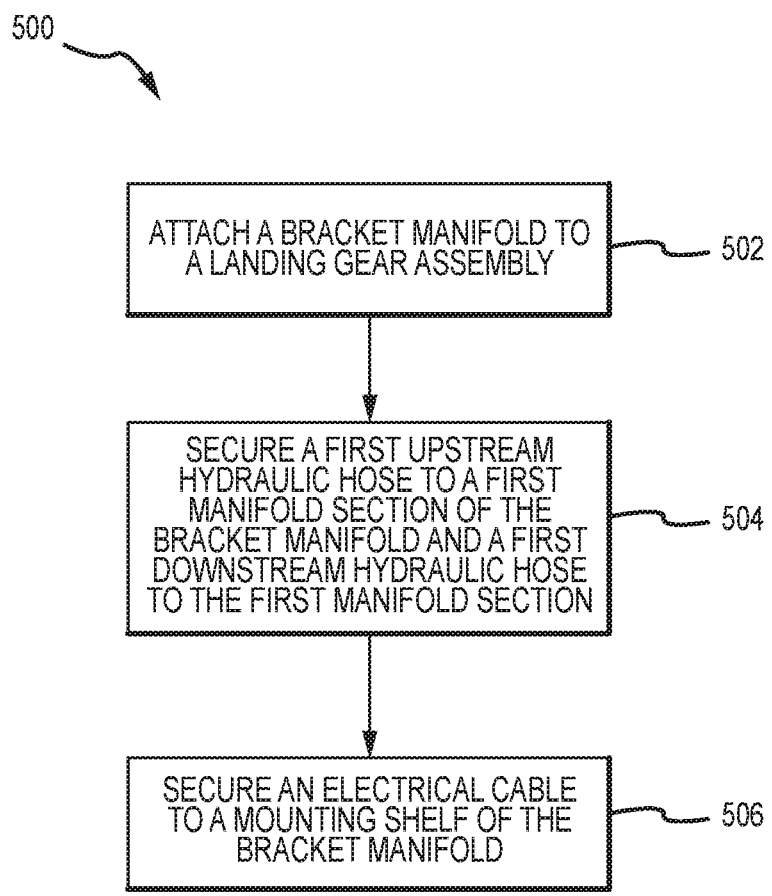
FIG. 5 illustrates a method of securing components of a hydraulic system and an electrical system to a landing gear assembly, in accordance with various embodiments.

Referring now to FIG. 5, a method 500 of securing components of a hydraulic system and an electrical system to a landing gear assembly is described. In various embodiments, a first step 502 of the method includes attaching a bracket manifold to the landing gear assembly, the bracket manifold including a mounting plate, a first manifold section integrated monolithically into the mounting plate and a mounting shelf integrated monolithically into the mounting plate. A second step 504 of the method includes securing a first upstream hydraulic hose to the first manifold section and a first downstream hydraulic hose to the first manifold section. A third step 506 of the method includes securing an electrical conduit to the mounting shelf. In various embodiments, the method 500 further includes the step of securing a second upstream hydraulic hose and a second downstream hydraulic hose to a second manifold section integrated monolithically into the mounting plate.

The foregoing disclosure provides various benefits regarding the bracket manifold via an additive manufacturing process for making the manifold bracket. In various embodiments, the additive manufacturing process used to fabricate the manifold bracket allows greater flexibility in creating the hydraulic passageways and shapes described above. For example, the manifold bracket includes several snake-like passageways in the manifold sections having approximately ninety degree (90°) bends. Traditional manufacturing techniques would require cross-drillings to complete the hydraulic path circuit through the manifold sections and expansion plugs, such as, for example, a Lee Plug® (www.theleeco.com), to close the drill holes. The snaking of passageways allows optimization of the shape design of such passageways to reduce potential stress concentrations that could cause premature cycle fatigue and to improve the hydraulics. Smoother flow paths, in general, will facilitate improved performance in hydraulic flow, particularly where the passageways have been post-processed from the original additive manufacture build to smooth surface roughness.

The additive manufacturing process also allows for targeted reinforcement of material to absorb the applied loads to the manifold bracket. These loads include, for example, internal pressure, inadvertent loads through contact by maintenance staff (e.g., inadvertent stepping on the bracket) and g-loads from random vibration. The additive manufacturing process also allows for improved routing of electrical harnesses by building up material locally at optimized locations to connect the harnesses rather than having to make additional brackets to mount the harnesses to the base of a main bracket. Further, the additional brackets for mounting the harnesses may be subject to their own manufacturing limitations, which may be avoided though fabrication of a single monolithic component.

The additive manufacturing process also allows for a better optimized structural shape of the base support. For example, with use of traditional manufacturing techniques, the resulting brackets may not be optimized structurally because of manufacturing limitations on the waste material that requires being machined out of the plate or other block of material used to fabricate the component. This limitation may lead to a higher weight solution and the need for more durable and, hence, more expensive mounting bolts. The additive manufacturing solution allows additional flexibility to drive the design to a more structurally optimized solution that provides a more efficient load path from and throughout the mounting plate, including the various manifold sections integrated to the mounting plate, to the attachment plate where the various attachment bolts are received.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

In various embodiments, system program instructions or controller instructions may be loaded onto a tangible, non-transitory, computer-readable medium (also referred to herein as a tangible, non-transitory, memory) having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media that were found by In Re Nuijten to fall outside the scope of patentable subject matter under 35 U.S.C. § 101.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A bracket manifold for a landing gear assembly having a torque link coupled to a shock strut assembly, comprising:
   a mounting plate having a central portion and a first wing portion extending from the central portion;
   a first manifold section integrated monolithically into at least one of the central portion and the first wing portion of the mounting plate;
   an attachment plate integrated monolithically into the mounting plate and attached to the torque link of the landing gear assembly;
   a first upstream connector integrated monolithically into the mounting plate and disposed in fluid connection with the first manifold section; and
   a first downstream connector integrated monolithically into the mounting plate and disposed in fluid connection with the first manifold section.

2. The bracket manifold of claim 1, further comprising a first base portion configured to provide an integral and monolithic transition between the first manifold section and the mounting plate.

3. The bracket manifold of claim 2, wherein the attachment plate includes an attachment plate aperture configured to receive an attachment bolt.

4. The bracket manifold of claim 3, further comprising a first side wall and a second side wall integrated monolithically into the attachment plate and into the mounting plate and configured to space the attachment plate from the mounting plate.

5. The bracket manifold of claim 1, further comprising a second manifold section integrated monolithically into the mounting plate.

6. The bracket manifold of claim 5, further comprising a second upstream connector integrated monolithically into the mounting plate and disposed in fluid connection with the second manifold section and a second downstream connector integrated monolithically into the mounting plate and disposed in fluid connection with the second manifold section.

7. The bracket manifold of claim 6, wherein the mounting plate includes a second wing portion extending from the central portion.

8. The bracket manifold of claim 7, further comprising a mounting shelf integrated monolithically into at least one of the central portion and the second wing portion.

9. The bracket manifold of claim 8, wherein the mounting shelf is configured to receive an electrical conduit.

10. The bracket manifold of claim 9, further comprising a shield integrated monolithically into at least one of the first wing portion and the second wing portion.

11. The bracket manifold of claim 10, further comprising an attachment plate configured to attach the bracket manifold to a component of the landing gear assembly and a first side wall and a second side wall integrated monolithically into the attachment plate and into the mounting plate and configured to space the attachment plate from the mounting plate.

12. A landing gear assembly, comprising:
a shock strut assembly having a piston slidably disposed within an outer cylinder;
a torque link assembly having a torque link coupled to the shock strut assembly; and
a bracket manifold attached to the torque link assembly, the bracket manifold comprising
a mounting plate having a central portion and a first wing portion extending from the central portion,
a first manifold section integrated monolithically into at least one of the central portion and the first wing portion of the mounting plate, and
a first upstream connector integrated monolithically into the mounting plate and disposed in fluid connection with the first manifold section and a first downstream connector integrated monolithically into the mounting plate and disposed in fluid connection with the first manifold section.

13. The landing gear assembly of claim 12, wherein the bracket manifold further includes a second manifold section integrated monolithically into the mounting plate, a second upstream connector integrated monolithically into the mounting plate and disposed in fluid connection with the second manifold section and a second downstream connector integrated monolithically into the mounting plate and disposed in fluid connection with the second manifold section.

14. The landing gear assembly of claim 13, wherein the mounting plate includes a second wing portion extending from the central portion and a mounting shelf integrated monolithically into at least one of the central portion and the second wing portion, the mounting shelf configured to receive an electrical conduit.

15. A method of securing components of a hydraulic system and an electrical system to a landing gear assembly having a torque link coupled to a shock strut assembly, comprising:
attaching a bracket manifold to the torque link of the landing gear assembly, the bracket manifold including a mounting plate, a first manifold section integrated monolithically into the mounting plate, a mounting shelf integrated monolithically into the mounting plate, a first upstream connector integrated monolithically into the mounting plate and disposed in fluid connection with the first manifold section and a first downstream connector integrated monolithically into the mounting plate and disposed in fluid connection with the first manifold section;
securing a first upstream hydraulic hose to the first manifold section and a first downstream hydraulic hose to the first manifold section; and
securing an electrical conduit to the mounting shelf.

16. The method of claim 15, further comprising securing a second upstream hydraulic hose and a second downstream hydraulic hose to a second manifold section integrated monolithically into the mounting plate.

\* \* \* \* \*